J. F. CLARK.
LOADING DEVICE FOR AUTOTRUCKS.
APPLICATION FILED OCT. 2, 1912.
1,200,411.
Patented Oct. 3, 1916.
2 SHEETS—SHEET 1.
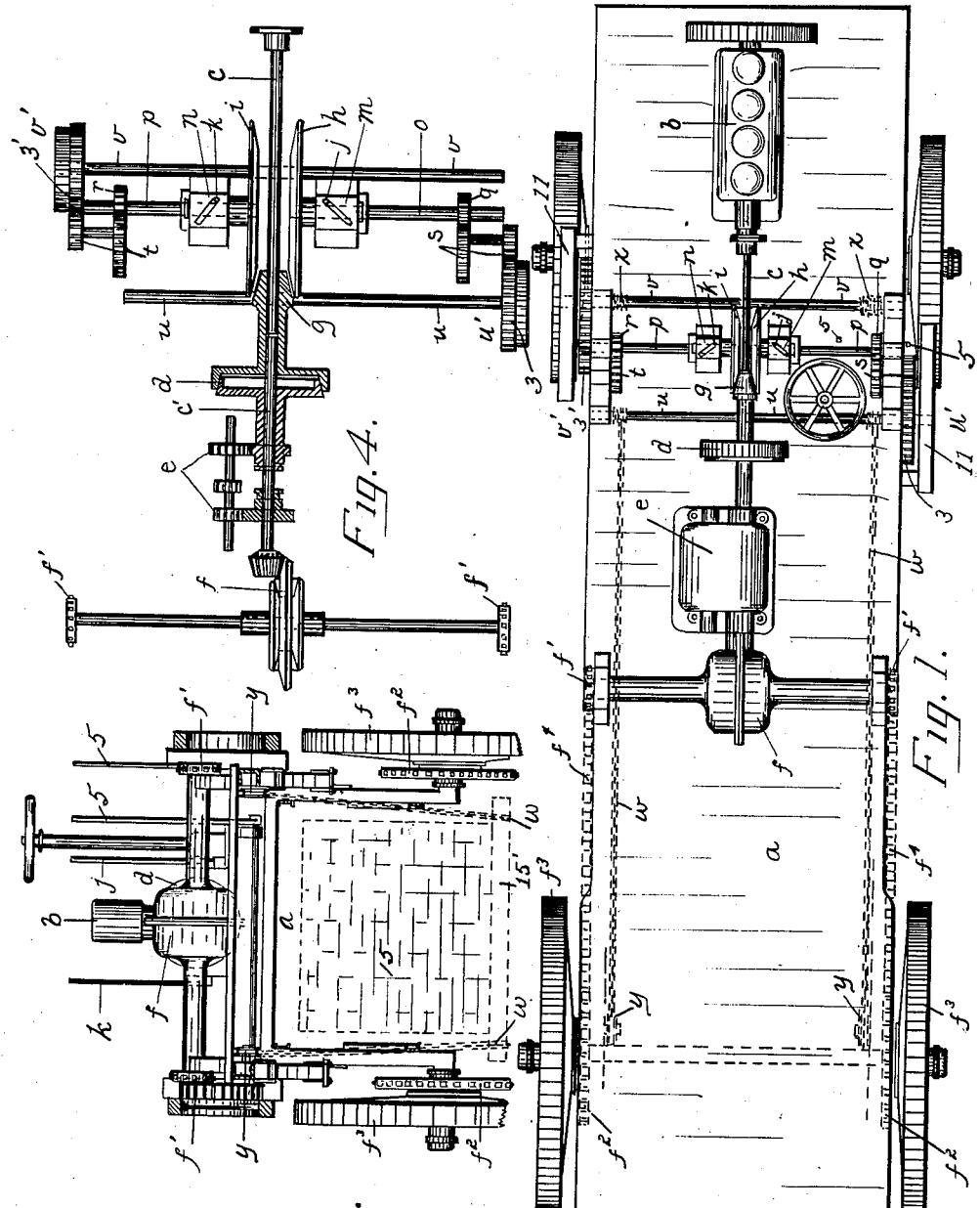
WITNESSES
INVENTOR
John F. Clark
BY
ATTORNEY J. F. CLARK.
LOADING DEVICE FOR AUTOTRUCKS.
APPLICATION FILED OCT. 2, 1912.
1,200,411.
Patented Oct. 3, 1916.
2 SHEETS—SHEET 2.
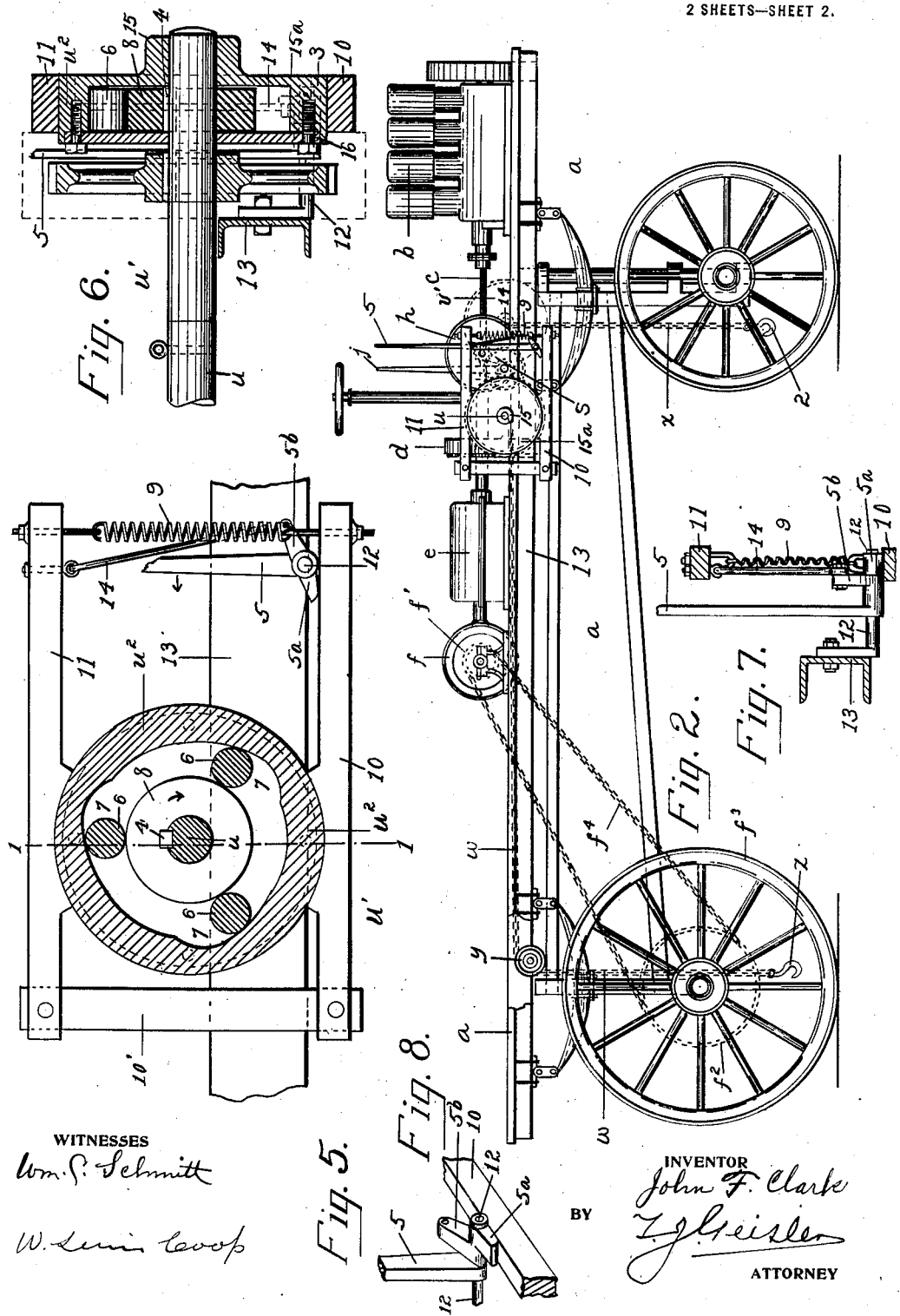

UNITED STATES PATENT OFFICE.

JOHN F. CLARK, OF PORTLAND, OREGON.

LOADING DEVICE FOR AUTOTRUCKS.

1,200,411.   Specification of Letters Patent.   Patented Oct. 3, 1916.

Application filed October 2, 1912. Serial No. 723,649.

*To all whom it may concern:*

Be it known that I, JOHN F. CLARK, a citizen of the United States, and resident of Portland, county of Multnomah, and State of Oregon, have invented a new and useful Improvement in Loading Devices for Autotrucks, of which the following is a specification.

My invention relates to auto-trucks of the type used in lumber yards. Such trucks are made with an elevated body adapted to permit the truck to be driven directly over the piled-up lumber to be loaded, and the lumber is secured under the body of the truck by suspended chains, winding on rotatable drums.

One of the main features of my invention is the providing of means whereby the power required for revolving the chain-drums is taken directly from the shaft.

My invention also has for its purpose the providing of improved means for controlling the operation of the chain drums.

These and incidental features are fully illustrated in the accompanying drawings in which—

Figure 1 is a plan view of an auto truck embodying my invention; Fig. 2 is a side elevation of the same; Fig. 3 is a rear elevation of my truck showing it loaded with lumber ready for hauling; Fig. 4 is a fragmental plan of the coöperating parts of the motion transmitting devices embodying my invention, certain parts being shown in section, and the bearings of all parts being omitted; Fig. 5 is a side elevation, partly in section, on a larger scale, showing one of the panel clutches and its controlling brake, which are included in the devices operating the chain drums; Fig. 6 is a vertical section taken on the plane of line 1—1 of Fig. 5, looking toward the right; Fig. 7 is a sectional detail of the lever-and-brake devices by which the panel clutch is controlled; and Fig. 8 is a fragmental perspective view of the controlling brake of the panel clutches.

$a$ represents a usual type of auto-truck having an elevated body. Its engine $b$, revolves the primary part $c$ of the divided driving shaft, which is made in two sections $c$, $c'$ (primary and auxiliary) as shown in Fig. 4. A disk friction clutch $d$, connects the two sections of the driving shaft, the operating lever being omitted in the drawings. When the friction clutch, $d$, is thrown into action, motion is transmitted to the rear truck wheels $f^3$, in the usual manner, through the medium of the differential gear-elements $e$ and $f$ and the sprocket wheels $f^1$ and $f^2$ with their connecting chain $f^4$. Rigidly fixed on the primary part $c$ of the driving shaft is a friction cone $g$, which may be made integral with the female member of the friction clutch $d$. The friction disks $h$ and $i$ are keyed on the shaft $o$ and $p$, and are brought into or out of contact with the rotating friction-cone $g$, by the operation of the levers $j$ and $k$. The latter bear in the eccentric thrust boxes $m$ and $n$, respectively, which are constructed in the usual form. Either of the disks $h$, $i$, may be brought into contact with the cone $g$ at any time, or they may be actuated simultaneously. At the outer extremity of the shafts $o$, $p$, are keyed pinions $q$ and $r$, which transmit motion through reducing gears, $s$ and $t$, to the gears 3 and 3', keyed on the shafts $u$ and $v$, respectively. The rear load-suspending chains $w$, are wound on the counter shaft $u$ by throwing the friction disk $h$ into engagement with the friction cone $g$. The chains $w$, run longitudinally to the rear of the truck where they pass over the pulleys $y$, and have attached to their ends the hooks $z$. In similar manner the forward load-suspending chains $x$, are wound and unwound on the counter shaft $v$ when the friction disk $i$, is thrown in engagement with the friction cone $g$. Said forward chains $x$ are also provided at their ends with hooks 2.

The lumber 15, to be loaded, is arranged in a uniform pile on cross pieces, as 15' to the ends of which the chains $w$ and $x$ are fastened. The devices are so arranged that by engaging the friction disks, $h$ and $i$, with the friction cone $g$, and throwing the clutch $d$ out of action the driving power transmitted from the engine will be transmitted to the shafts $u$ and $v$, thereby winding up the rear and fore chains simultaneously, and consequently lifting the lumber up under the body of the truck. In order to hold the load at any point of suspension and also to enable me to control the paying out of the load-suspending chains, I have provided automatic brake elements $u'$ and $v'$ mounted on one end of, and controlling the counter or driven shafts $u$, and $v$, as shown in Fig. 4. Said brake elements are identical in construction and perform similar functions, therefore I shall describe only the details of the brake element $u'$, which are illustrated in Figs. 5 and 6. A disk 8 is keyed on the outer end of the shaft $u$, and the annular member $u^2$—consisting of a cylindrical rim provided with an integral web 15ª having a boss 15—is rotatably mounted on the shaft $u$ over the disk 8. The interior periphery of the rim of the member $u^2$ is formed with a series of cam recesses as shown at 7 in Fig. 5, and loose rollers 6 or rolling wedge elements, located in said cam recesses, provide the operating contact between the disk 8 and the rim of the member $u^2$. On the inner side of the member $u^2$ is fastened a plate 16. The disk 8, being keyed to the shaft $u$, restrains the member $u^2$ from lateral movement. The rollers 6 are held in place between the web 15ª and plate 16.

The member $u^2$ of the panel clutch is normally held against rotation by an automatic brake mechanism, also illustrated in Fig. 5, and consisting of brake shoes 10, 11, pivoted to a post 10' rigidly secured to the member 13 of the truck body. The opposite ends of the brake shoes 10, 11, are connected by a coil-spring 9. The latter normally holds the brake shoes firmly on the rim of the member $u^2$, thereby preventing the latter from rotating. A double bell-lever 5 5ª or lever controlled cam is fulcrumed on the pin 12, which projects from the member 13 of the truck body. The bell-lever 5 5ª, or lever controlled cam includes a lever arm 5, and the part 5ª which bears on the shoe 10 and the part 5ᵇ is connected by a link 14 with the brake shoe 11. It will therefore be seen that a backward movement of the lever arm 5 will cause the brake shoes 10, 11 to be thrust apart thereby releasing the member $u^2$. When the shaft $u$ and therewith the disk 8 travel clockwise (having reference to the arrangement of the parts as shown in Fig. 5) the rollers 6 will move into the deeper portions of the cam recesses 7, thus allowing the shaft $u$ to rotate freely, notwithstanding the member $u^2$ is restrained from rotating by the automatic action of said braking mechanism. A counter clockwise rotation of the shaft $u$, that is in a direction to unwind the chains $w$, however, would cause the rollers 6 to become speedily wedged between the disk 8 and the rim of the annular member $u^2$, and thus prevent rotation of the shaft $u$ in its unwinding direction, because of the member $u^2$ being held against rotation by said brake mechanism. By operating the lever 5 to disengage the brake shoes the shaft $u$ is permitted to rotate in its unwinding direction at will.

I claim:

1. In combination with a motor-driven vehicle, independent winding drums and operating connections between the latter and the motor, said connections including transverse shafts extending on opposite sides of the motor shaft, driving connections between said transverse shafts and the motor shaft, independent means for placing said driving connections into and out of active engagement, and driving connections between the transverse shafts and the winding drums.

2. In combination with a motor-driven vehicle, independent winding drums and operating connections between the latter and the motor, said connections including transverse shafts extending on opposite sides of the motor shaft, driving connections between said transverse shafts and the motor shaft, independent means for placing said driving connections into and out of active engagement, driving connections between the transverse shafts and the winding drums, and said last mentioned driving connections including means for permitting the winding drums to rotate freely in one direction.

JOHN F. CLARK.

Witnesses:
L. J. WENTWORTH,
G. C. WENTWORTH.